HEATWOLE & MAUCK.
Hominy Mill.
No. 28,079.  Patented May 1, 1860.
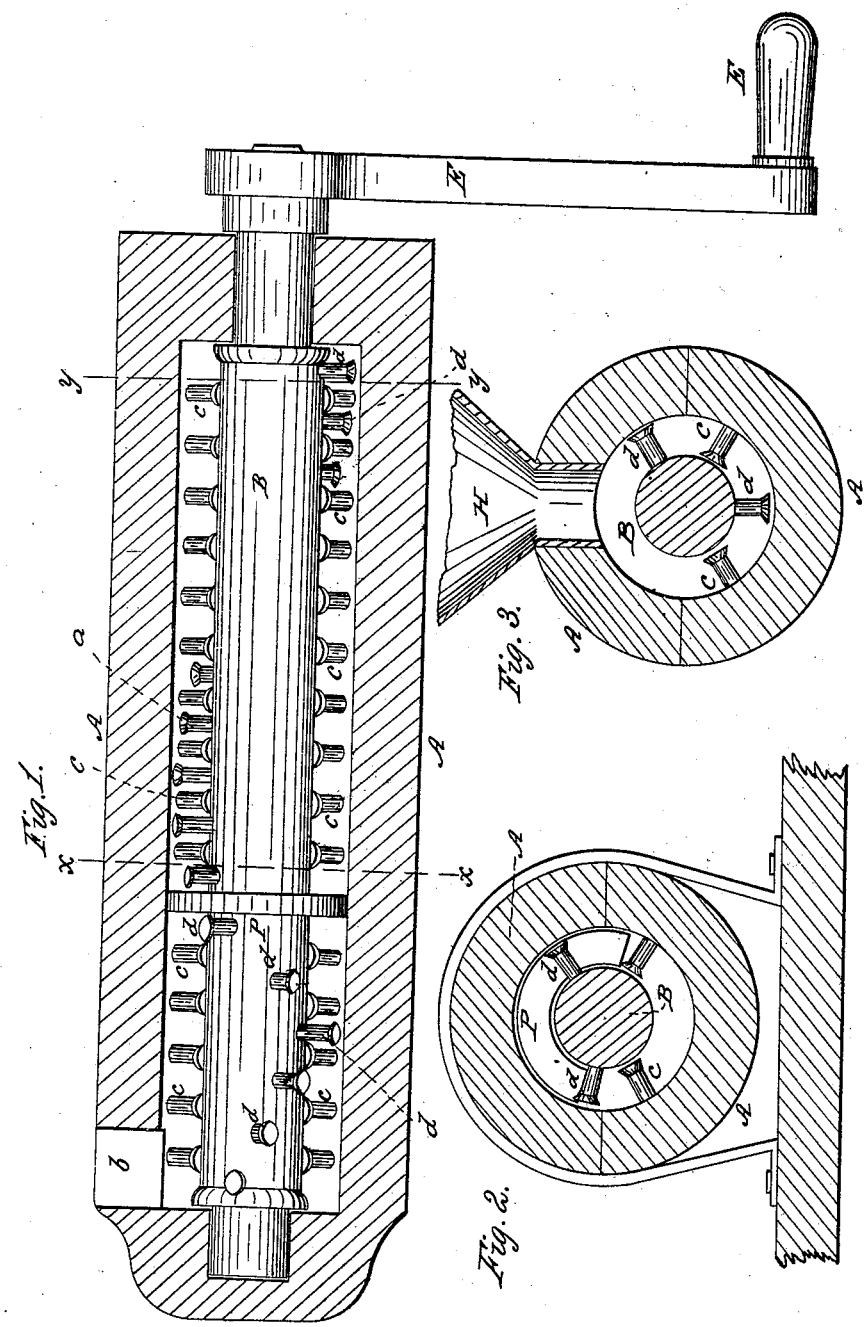

UNITED STATES PATENT OFFICE.

JNO. D. HEATWOLE AND R. C. MAUCK, OF HARRISONBURG, VIRGINIA.

HOMINY-MILL.

Specification of Letters Patent No. 28,079, dated May 1, 1860.

*To all whom it may concern:*

Be it known that we, J. D. HEATWOLE and R. C. MAUCK, both of Harrisonburg, in the county of Rockingham and State of Virginia, have invented a new and useful Improvement in Hominy-Mills; and we do hereby declare that the following is a full, clear, and exact description of the construction and operation of the same, reference being had to the annexed drawing, forming part of this specification, in the several figures of which similar characters of reference denote the same parts.

Figure 1 is a view showing the interior of mill; the upper portion of concave being removed for that purpose. Fig. 2 is a cross section on line $x$ $x$, of mill complete, looking toward partition P, and showing position of said partition. Fig. 3 is a cross section on line $y$ $y$, showing position of feed hopper.

This is a mill in which the hulling is effected by two systems of headed beaters, upon cylinder and concave, the beaters on the cylinder being set spirally, and those of the concave in right lines upon opposite sides of the lower half of said concave, the grain being fed to the machine at one extremity and discharged at the other, the nature of the invention consisting in constructing the beaters with heads for the better performance of the operation, and in the introduction between the cylinder and concave on the upper side of a partition, for preventing the free passage of the grain between that portion of cylinder and concave, and thus insure its passage between the beaters before it can make its exit from the machine.

The details of construction and operation will be understood by the following description and reference to the drawing, in which the several parts are represented as follows: A, concave, whose lower portion is armed with two rows of headed beaters $c$, in right lines, as shown in Figs. 1 and 2, the upper portion being provided with a hopper H (Fig. 3) for the entrance of the grain, and the opposite extremity having a discharge opening $b$. The ends of the concave are so formed as to provide bearings for the journals of the cylinder. B, cylinder, armed with a system of headed beaters $d$ set spirally upon the surface thereof, so as to give the grain a movement toward the discharge opening $b$. Near this discharge opening the beaters are set in a spiral reverse from the line of the others so as to give a backward tendency to the contents of the concave when near the discharge opening, and thus retain the grain for a greater length of time under the operation. The cylinder is provided with a crank E by which it is rotated in the usual manner. P, partition, whose position is shown in Figs. 1 and 2. It extends from cylinder and concave on the upper or conveying side of the cylinder, and by preventing the passage of the grain over and along this space, causes it to pass between the beaters and receive the action thereof before it can reach the discharge opening $b$. By this partition it is rendered impossible for any grain to pass through the machine without being submitted to the action of the headed beaters.

The corn is poured into a hopper H placed in an opening in the top of the concave near the crank, and by turning the crank it is brought in contact with the headed beaters on the concave A, and cylinder B, and is thus broken and hulled and converted into hominy, the partition P operating as a check to the action of the spiral to prevent a quantity of corn from passing along the vacancy formed by the beaters passing up on the back side of the concave, which, were it not for the partition, would fail to pass through the beaters. The reversed spiral operates as a check to the main spiral, and also assists in preventing any of the corn from passing through before it is properly husked. The arrangement of the spiral is such as to convey the corn forward, and beyond the reversed spiral to the discharge opening $b$, at the end of the concave, and each beater in the cylinder is so arranged that no two of them will be passing the beaters in the concave at the same time.

The use of the headed beaters is advantageous inasmuch as the corn when caught by the beaters is compressed between the heads, which, (the grain being broken or split before they can pass) serve to rub the ends of the grain to a much better advantage than could be done without heads, and renders this construction of beaters an improvement.

Having thus described the construction, and operation of our invention, we do not claim the spiral action and reaction as we are aware that it has been used before; but

We claim—

The combination of the partition P with the two systems of headed beaters $c$ and $d$ on cylinder and concave, constructed, arranged and operating substantially as and for the purpose set forth.

In testimony whereof we have hereunto signed our names before two subscribing witnesses.

JNO. D. HEATWOLE.
R. C. MAUCK.

Witnesses:
SAML. R. STERLING,
O. C. STERLING.